United States Patent [19]
Hetzel

[11] 3,746,902
[45] July 17, 1973

[54] ROTOR AND STATOR MOUNTING FOR DYNAMIC MACHINES

[75] Inventor: Robert J. Hetzel, Maple Heights, Ohio

[73] Assignee: Avtron Manufacturing, Inc., Cleveland, Ohio

[22] Filed: Dec. 30, 1971

[21] Appl. No.: 214,487

Related U.S. Application Data
[63] Continuation-in-part of Ser. No. 71,726, Sept. 14, 1970, abandoned.

[52] U.S. Cl. .................... 310/67, 310/154, 310/156
[51] Int. Cl. ............................................. H02k 7/00
[58] Field of Search ...................... 310/159, 156, 67, 310/43, 254, 75 D, 268

[56] References Cited
UNITED STATES PATENTS

| | | | |
|---|---|---|---|
| 3,178,599 | 4/1965 | Krupick et al. ..................... | 310/154 |
| 3,310,694 | 3/1967 | Hanna et al. ....................... | 310/154 |
| 2,929,944 | 3/1960 | Shewmon ............................. | 310/67 |
| 3,452,228 | 6/1969 | Woolley ................................ | 310/67 |
| 2,861,203 | 11/1958 | Luneau et al. ...................... | 310/43 X |

*Primary Examiner*—D. F. Duggan
*Attorney*—Richard MacCutcheon

[57] ABSTRACT

For cooperation with stator and rotor of a main drive unit and for control or measurement system having an analog voltage generator, a digital pulse generator is flat shaped and has a stator which is secured to be supported by the main drive stator while the pulse generator has a shaft coupled to be driven by the main drive unit rotor.

2 Claims, 8 Drawing Figures

Patented July 17, 1973

PRIOR ART

INVENTOR.
ROBERT J. HETZEL
BY
Richard Mac Cutcheon
ATTORNEY.

INVENTOR.
ROBERT J. HETZEL
BY
Richard MacCutcheon
ATTORNEY.

Patented July 17, 1973

INVENTOR.
ROBERT J. HETZEL
BY
Richard Mac Cutcheon
ATTORNEY.

ROTOR AND STATOR MOUNTING FOR DYNAMIC MACHINES

CROSS REFERENCE TO RELATED APPLICATION

The present Application is a Continuation In Part of my co-pending Application Ser. No. 71,726, filed Sept. 14, 1970, now abandoned for DIGITAL GENERATOR SHAPE AND ITS MECHANICAL MOUNTING WITH RESPECT TO AND OF ASSOCIATE APPARATUS, and assigned to the same assignee.

BACKGROUND OF THE INVENTION

The present invention relates to machines having shafts, e.g., dynamoelectric machines, or hydraulic pumps or motors, and is believed to have particular significance in connection with retrofits (e.g., additions, to existing analog tachometer generator installations, of new digital equipment for display or control or both). However, the invention is also applicable to all-new equipment installations.

As is known, analog (d.c. or sometimes rectified a.c.) tachometer generators give speed information as a voltage level but have the disadvantage of inaccuracy, e.g. as compared with digital (pulse frequency) techniques which afford an accuracy several orders of magnitude greater, and are not subject to "drift" with temperature change, component ageing, or the like. Nevertheless, in a great many installations both techniques are desired in order to both economically and adequately display and control rotative speed at a given point in a process. This requires two tachometer generators, one analog, the other pulse (digital), while a main motor, at its other end driving the load, or even a work supporting idler roll, or whatever is being monitored, customarily has but one end available for mounting such apparatus.

Heretofore, the analog generator has had its shaft connected to main drive shaft (its end bracket may even be connected to that of main drive) but expensive, time consuming, unwieldy and space requiring means (e.g., mounting brackets, pulleys, belts, chains and sprockets, safety covers, flexible couplings, gear boxes, etc.) have been thought necessary in order to mount and drive the pulse generator.

An object of the present invention is to provide simple, safe and inexpensive means for overcoming the above mentioned difficulties.

DESCRIPTION OF DRAWINGS

Other objects and advantages will become apparent and the invention may be better understood from consideration of the following description taken in connection with the accompanying drawings, in which:

Referring to FIG. 1A, an assumed load driving main motor is part shown at 10 and its feet are assumed supported on a base schematically represented as B-1.

An out-voltage-analagous-to-speed tachometer generator 11 is mounted on a bracket or base B-2 and connected to be driven by the main motor's shaft as through a flexible coupling 12.

In the prior art it is known to add a pulse-frequency tachometer generator 13, but this can require a third base or bracket B-3 (if top and sides and commutator end of analog generator are rounded), as well as a space consuming belt or chain or gear or other mechanical drive, such as that shown at 14.

In the other drawing figures like parts are like numbered.

Figure 1A:
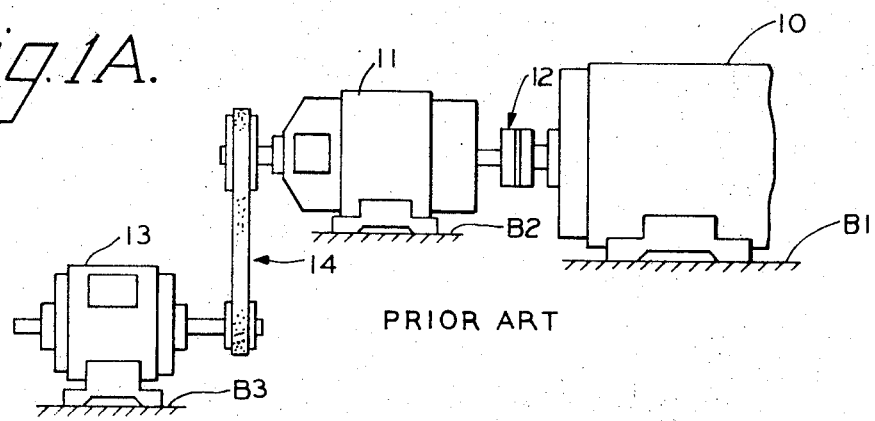
FIGS. 1A – D are diagrammatic representations of prior art arrangements.
Figure 1B:
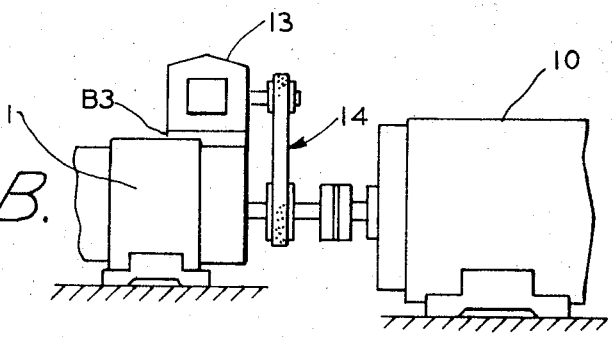
Figure 1C:
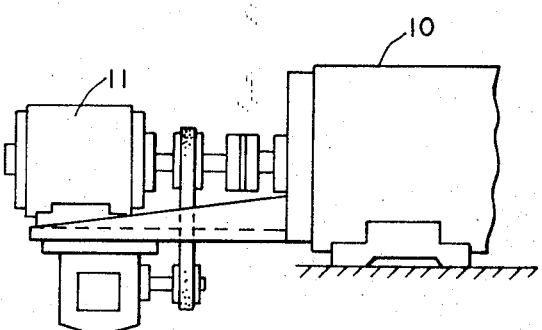
Figure 1D:
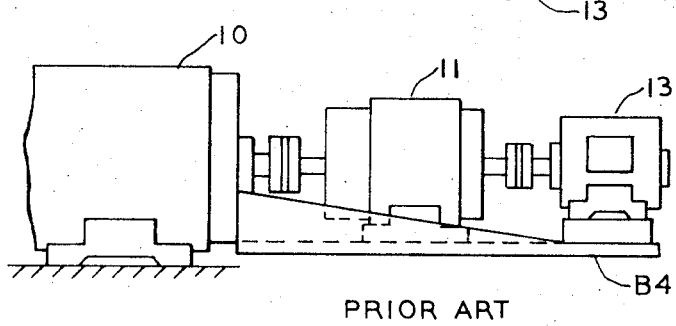

FIGS. 1B - 1D are typical for many prior art arrangements. Gear boxes could be used but they are expensive, as are made-in-the-field gear arrangements. The later require periodic lubrication and are dangerous if not covered (and even then when cover is removed for maintenance), as is true also of chain and sprocket drives. Also, the pulse generator parts much be positioned in such manner as to remove all discernable parallel and angular misalignment of shaft. V-belts slip if too loose (producing an inaccurate output) and reduce life of generator bearings if too tight. Difference gearing can be placed internally in pulse tach and a straight through drive as in FIG. 1D is sometimes preferred, but then, if the pulse tach 13 is a retrofit, a long cantilever mounting base B-4 must also be made and substituted, as a retrofit.

Figure 2:
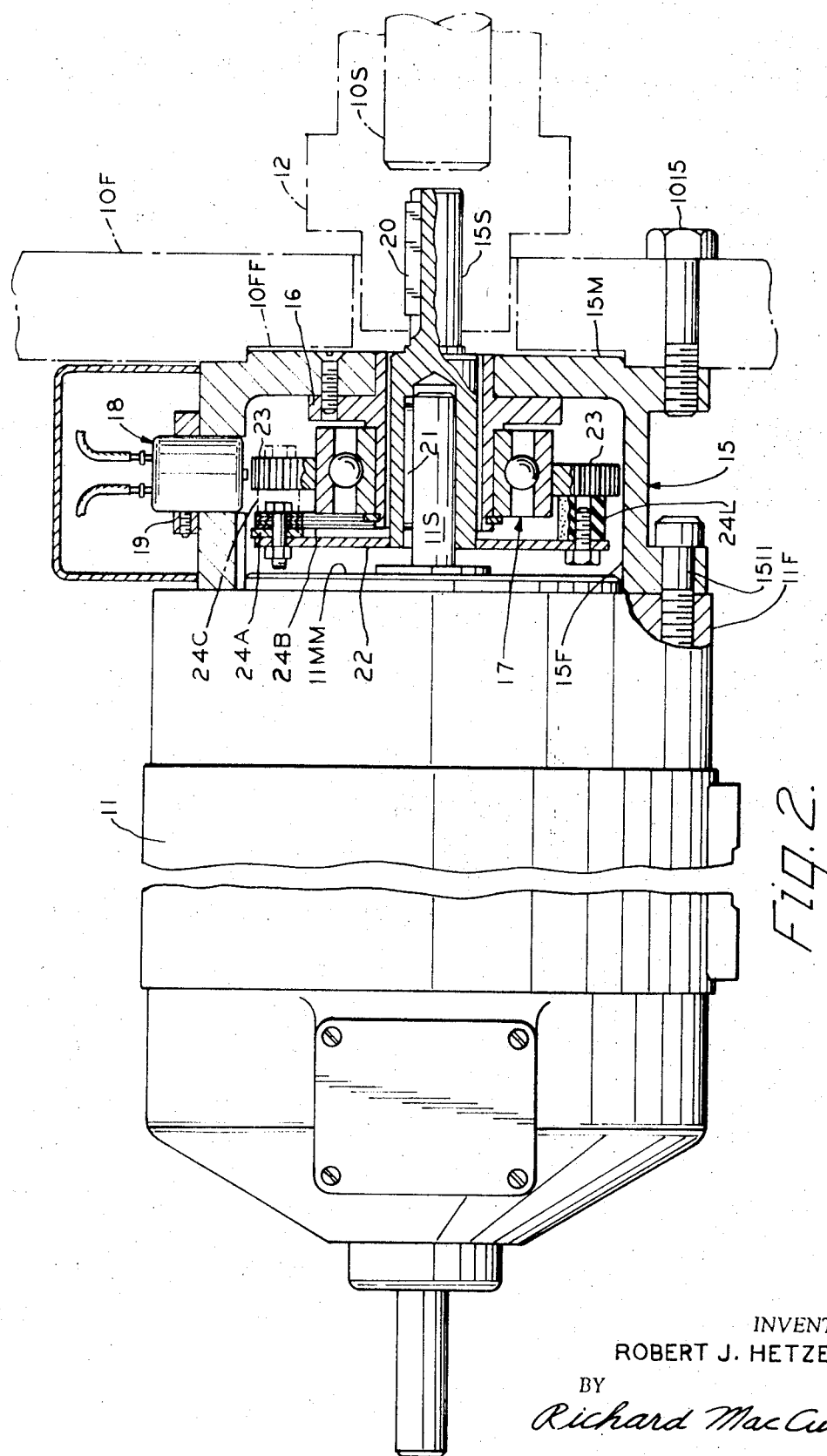
FIG. 2 shows an arrangement according to the invention.

By contrast, FIG. 2 shows an arrangement according to the invention and which overcomes the difficulties. In FIG. 2, a flat shaped pulse generator 15 is sandwiched between a main (e.g., motor) flange 10-F and a flange 11-F on the analog generator 11.

Standards as set forth by the National Electrical Manufacturers Association and adopted by the industry make this very feasible even for many retrofits. For example, in numerous systems, the anlalog generator (e.g., a NEMA BC 46, or a NEMA BC 42 frame size) has a NEMA D male face (11MM in FIG. 2) for mating as with a NEMA D female face (10FF) already to be found on the main motor, or even on a roll stand.

By pancaking, bringing pulse tach axial dimensions in where possible and taking them out where need be, the pulse tach 15 is provided with a female mounting 15F to accept one NEMA D (11 MM) at one end and provided with a male mounting 15M for accommodating the other NEMA D (10 FF) at its other end.

Shaft connections are then important, since air gap criticality is important, and the air gap of each generator must be determined by its own bearings (or, in other words, by the company which makes the particular generator) and not by the relatively inaccurate drilling of bolt holes in flanges or by the tightening of bolts therein. Yet the construction of the flat generator 15 shown in section in FIG. 2, and about to be described, permits ideal shaft connections.

Plural fasteners, such as bolts — one of which is shown at 1015 — are used to mount the flat generator 15 on the main drive flange 10F, while plural fasteners — such as that shown at 1511 — mount the analog tach 11 from a mating flange on the flat tach 15.

Within the flat tach, other stationary parts as shown include a bearing support collar 16, for supporting the stationary portion of a bearing 17, and a variable reluctance type pickup unit 18 which could be of the permanent magnet, variable reluctance and gear tooth arrangement such as is described in U. S. Pat. No. 3,492,518 of which issued Jan. 27, 1970 on an application filed by R. A. Wayne and assigned to the assignee of the present invention, but the pickup has little to do with many aspects of the present invention and another sort of pickup or winding could be used instead. However, the variable reluctance and gear tooth arrangement, here assumed for the purpose of illustration, does provide for air gap adjustment by merely sliding the pickup 18 up or down and thereafter tightening a collar 19 thereabout.

Rotating parts of the flat tachometer generator illustrated include its own shaft 15-S shown extending rightwardly into the main motor where it is keyed as by a key 20 to a flexible coupling 12 driven by main motor shaft 10-S. At its opposite end the pulse tach shaft 15-S is enlarged and hollow and within this portion the analog tach shaft 11-S is firmly keyed as by taper fit of a shaft key 21.

Pulse tach shaft 15-S as shown rotates a driving web 22 which rotates a relatively large gear 23 whose teeth cooperatively pass a probe rod of the pickup unit 18. Some liberties have been taken in the patent drawing, and the gear teeth are of course on the outside, and the drawing shows two alternative preferences for flexible connection between the bearing 17 (hence stator) supported gear 23 and the shaft 11-S supported driving web 22. According to one alternative, there are three, 120° spaced, flexible mounts, e.g., of rubber, interposed between web 22 and gear 23, each like the one shown at 24-L below shaft center in FIG. 2. According to another alternative, and as indicated above shaft center, there could be a full circular assembly of (1) three steel clamping washers, such as that shown at 24-A, each adjacent driving web 22, (2) plural, such as five, beryllium-copper (or other "spring") washers 24-B each extending 360° around shaft center, and (3) three steel clamping washers (adjacent gear 23) such as that at 24-C shown dashed because actually remote (e.g., 60° away). With, for example, a 60° spacing between alternately facing bolts, the spring washers 24-B and the clamp washer 24-A are secured to the driving web at a triad of 120° spaced apart points, while the spring washers 24-B and the clamp washer 24-C are secured to drive the gear at points midway between the 24-A fastening points, as has been found particularly advantageous to eliminate any distortion of the pulse tach pickup-to-gear airgap caused by factory alignment or misalignment or other eccentricities of the analog tachometer shaft.

Figures 3, 4, 5:
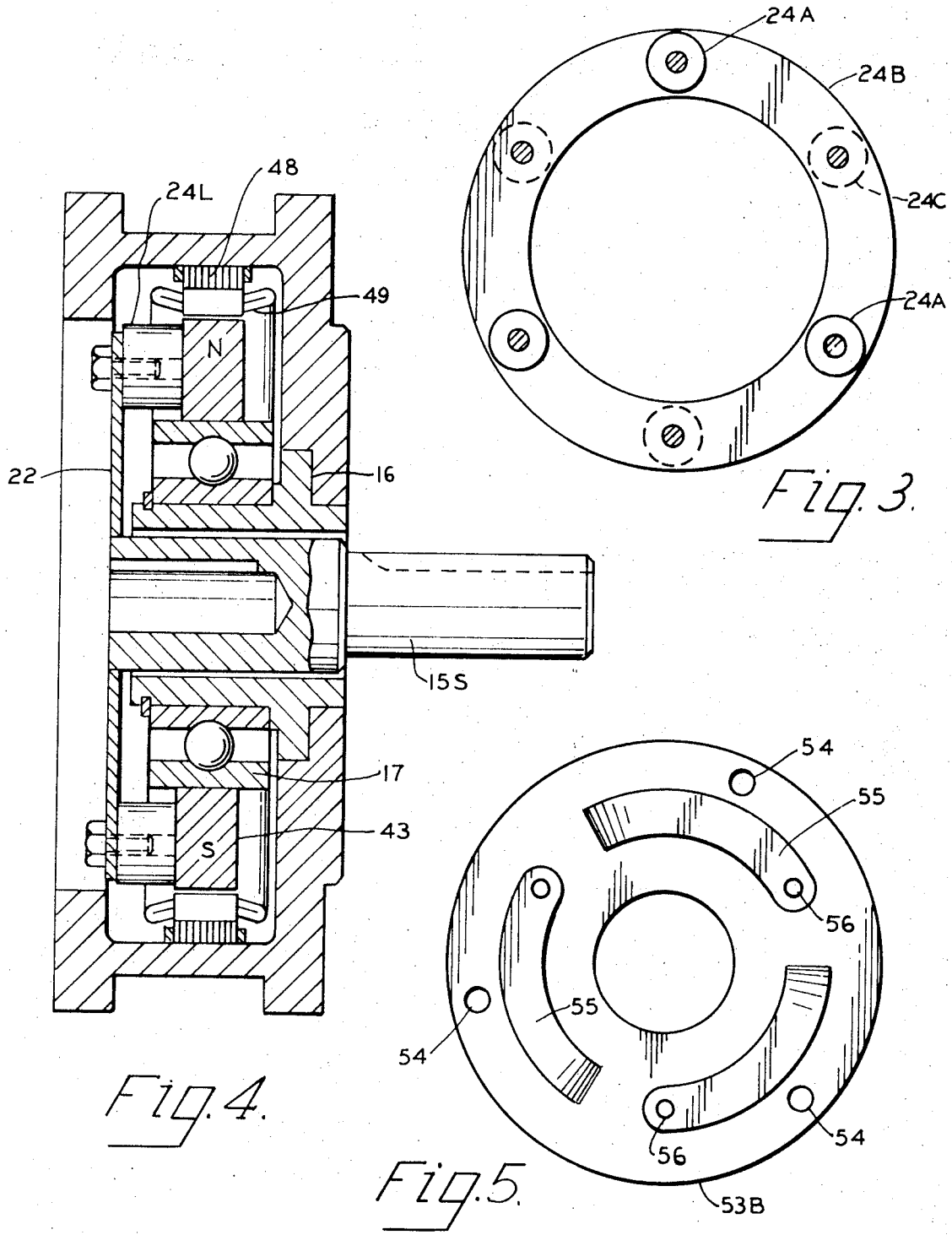
FIGS. 3 and 4 are details showing options.
FIG. 5 shows another modification.

For clarity, FIG. 3 has been added to detail the, for example, Be Cu (FIG. 2 upper option, left-most) washer 24B with steel clamp washers 24A adjacent, while at the back of the assembly oppositely facing bolts secure the gear (not shown in FIG. 3) and the other clamp washers 24C, and the spring washer assembly, at intervening 120° spaced locations.

FIG. 4 is a full detail showing the (FIG. 2) lower option where small rubber washers 24L are used. They may have threaded inserts for bolting to the driving web (or spider) 22, while being either adhesively affixed at their opposite ends to the gear, or secured thereto by screws (not shown). In FIGS. 3 and 4, like parts are like numbered as before. But FIG. 4 represents a modification, for it is, of course, not necessary that the a.c. generator provide (steep front) pulses. It might produce sine waves instead. Yet it is advantageous to keep the rotor short, and so FIG. 4 assumes a radially polarized permanent magnet rotor 43 having one or more pairs of N-S poles. A laminated stator core 48 is assumed to support a distributed type winding 49, with 48 – 49 thus serving as a pickup transducer when the P.M. rotor is being rotated.

An important feature is that the a.c. generator shaft need have no (direct) anti-friction bearing, and can thus accommodate itself to bearings of other machines. This requires a resilient means, like the driving web 22, which could be a disc, or could be a spider merely having arms. Web or spider 22 might in itself have all the necessary resiliency but I have a slight preference for having it non-resilient and then providing more controllable resilient means between it and the "bearinged" rotor. Such resilience could be provided as in FIG. 3, or as in FIG. 4, or it could take a variety of other forms, one of which is shown in FIG. 5.

For the FIG. 5 arrangement, 53 B is a wheel of spring material provided with holes 54 for bolting to a driving web or spider (such as 22). A plurality of fingers 55 have been lanced out, and may be either bent or not, and then tips 56 on the respective fingers of the spring wheel are adhesively secured to a dynamoelectric machine rotor (such as 23, or 43).

SUMMARY OF OPERATION AND ADVANTAGES

By just substituting a gear 23 of different pitch (number of teeth) it is easy to change pulse tach Pulses Per Revolution, for example from 60 up to, say, 320, but it is of course also very easy to change the ratio (of PPR, or Pulses Per Second for any given shaft speed) in the electronic pulse responsive circuitry which follows and is not herein described. More important, the flat construction of at least one of a pair of associated tachometers combined with the male-female fits of the two, both with regard to their shafts, and also as regards their frames, provides very rigid coupling means, as seen in FIG. 2, all the way from the driving unit flexible coupling 12 to the last tachometer in line, without any adverse cantilever effect. Even so, there are five flexible members (Be-Cu springs) or three (rubber mounts) obviating misalignment or eccentricity of the two generators, usually from different manufacturers and first seen as a pair only in the field and by workmen who do not generally know how important proper alignment can be.

Compared with one prior arrangement there is thus a feasibility, for it has been found that using one shaft for three bearings distributed in two machines leads to all sorts of difficulties, and compared with all prior art expedients there is a considerable cost saving for customers, particularly since in many instances only a minimum of digital apparatus need be supplied because existing analog generators and associate analog measurement and/or control apparatus can be retained, instead of scrapped.

I have talked of a "Main Drive Unit" only for clarity and by way of example. There might be another sort of device having rotative and stationary portions instead, and in some of the claims hereafter this will be referred to as a "first machine unit." Similarly, an "Analog Voltage Generator" was used just as an example. Any other device having rotative and stationary portions, E. G., a hydraulic pump, might exist in lieu thereof, and still, in claims hereafter, be intended to be covered by the words "second machine unit" perhaps because it is so often second to arrive upon the scene of installation. A digital generator can be a third unit. According to one aspect of the invention it can be, or is, sandwiched between first machine unit and the second machine unit. But according to another aspect of the invention, this need not be the case, for the shape of the digital machine is itself inventive and it can be placed last in line (at what the art calls the "front") of an assembly of either three units or of but two.

But, whether, the "pancake" unit is a third unit or only the second to be found (in the latter case making later addition easy), this flat shape unit need not be a pulse generator, not even a generator. And in the claims hereafter I will call it a "dynamic machine." It presumably at least has a stator-rotor combination for energy conversion, but is could itself be "a" or "the" motor or engine or it could be a fluid pump, for, while I have illustrated and described a particular embodiment, various modifications may obviously be made without departing from the true spirit and scope of the invention which I intend to have defined only by the appended claims taken with all reasonable equivalents insofar as the prior art permits.

I claim:
1. A dynamic machine comprising
a flat stator which has a means for mounting said machine,
a rotor arranged for cooperation with said stator,
an anti-friction bearing whose inner race is stationary and whose outer race mounts the rotor for relative rotation,
a shaft, and
a resilient means secured to rotate with the shaft and with the rotor, whereby to obviate problems of radial alignment while minimizing axial dimension.
2. A dynamoelectric machine which is as in claim 1 further characterized by permanent magnet means for causing radial polarization in at least one of the stator and rotor and for keeping the dynamoelectric machine axially short.

* * * * *